(12) United States Patent
Teo

(10) Patent No.: US 9,934,522 B2
(45) Date of Patent: Apr. 3, 2018

(54) SYSTEMS AND METHODS FOR BATCH-LISTING ITEMS STORED OFFLINE ON A MOBILE DEVICE

(75) Inventor: Seng Tien Jonathan Teo, Lane Cove North (AU)

(73) Assignee: eBay Inc., San Jose, CA (US)

( * ) Notice: Subject to any disclaimer, the term of this patent is extended or adjusted under 35 U.S.C. 154(b) by 791 days.

(21) Appl. No.: 13/427,324

(22) Filed: Mar. 22, 2012

(65) Prior Publication Data

US 2013/0254059 A1    Sep. 26, 2013

(51) Int. Cl.
  *G06Q 30/00*  (2012.01)
  *G06Q 30/06*  (2012.01)
  *G06Q 30/08*  (2012.01)

(52) U.S. Cl.
  CPC ......... *G06Q 30/0601* (2013.01); *G06Q 30/08* (2013.01)

(58) Field of Classification Search
  CPC ................................................. G06Q 30/0601
  USPC .................................................... 705/26, 27
  See application file for complete search history.

(56) References Cited

U.S. PATENT DOCUMENTS

| | | |
|---|---|---|
| 5,546,475 A | 8/1996 | Bolle et al. |
| 5,781,899 A | 7/1998 | Hirata |
| 5,845,265 A | 12/1998 | Woolston |
| 5,870,149 A | 2/1999 | Comroe et al. |
| 6,134,548 A | 10/2000 | Gottsman |
| 6,157,435 A | 12/2000 | Slater et al. |
| 6,216,227 B1 | 4/2001 | Goldstein et al. |
| 6,434,530 B1 | 8/2002 | Sloane et al. |
| 6,483,570 B1 | 11/2002 | Slater et al. |
| 6,484,130 B2 | 11/2002 | Dwyer et al. |
| 6,512,919 B2 | 1/2003 | Ogasawara |
| 6,530,521 B1 | 3/2003 | Henry |
| 6,549,913 B1 | 4/2003 | Murakawa |
| 6,563,959 B1 | 5/2003 | Troyanker |
| 6,587,835 B1 | 7/2003 | Treyz et al. |
| 6,947,571 B1 | 9/2005 | Rhoads et al. |
| 7,007,076 B1 | 2/2006 | Hess et al. |
| 7,302,429 B1 | 11/2007 | Wanker |
| 7,363,252 B2 | 4/2008 | Fujimoto |
| 7,373,317 B1 | 5/2008 | Kopelman et al. |
| 7,418,408 B1 | 8/2008 | Heppe |
| 7,593,602 B2 | 9/2009 | Stentiford |

(Continued)

FOREIGN PATENT DOCUMENTS

WO    WO-2011106555 A1    9/2011

OTHER PUBLICATIONS

"U.S. Appl. No. 13/032,338, Non Final Office Action dated Aug. 31, 2012", 18 pgs.
"U.S. Appl. No. 13/032,338, Response filed Dec. 28, 2012 to Non Final Office Action dated Aug. 31, 2012", 13 pgs.

(Continued)

*Primary Examiner* — Robert M Pond
(74) *Attorney, Agent, or Firm* — Schwegman Lundberg & Woessner, P.A.

(57) ABSTRACT

Embodiments of computer-implemented systems and methods are described for listing on a marketplace an item, or batch-listing a plurality of items, previously stored on a mobile device. One example embodiment comprises receiving a request from the mobile device for a price estimate for the prospective sale of an item or a plurality of items and subsequently receiving a request to list the item or a plurality of items. The listing process may include receiving images of one or more items, receiving data associated with the one or more items, and using the data, listing the one or more items on the marketplace.

26 Claims, 11 Drawing Sheets

(56) References Cited

U.S. PATENT DOCUMENTS

| | | | |
|---|---|---|---|
| 7,761,464 | B2 | 7/2010 | Radlinski et al. |
| 7,890,386 | B1 | 2/2011 | Reber |
| 7,921,040 | B2 | 4/2011 | Reber |
| 7,933,811 | B2 | 4/2011 | Reber |
| 7,991,646 | B2* | 8/2011 | Lewis ............... G06Q 30/0601 705/26.1 |
| 2001/0007981 | A1 | 7/2001 | Woolston |
| 2001/0044758 | A1 | 11/2001 | Talib et al. |
| 2001/0049636 | A1 | 12/2001 | Hudda et al. |
| 2002/0042835 | A1 | 4/2002 | Pepin et al. |
| 2003/0065583 | A1 | 4/2003 | Takaoka |
| 2003/0065584 | A1 | 4/2003 | Takaoka |
| 2003/0083961 | A1 | 5/2003 | Bezos et al. |
| 2003/0105728 | A1 | 6/2003 | Yano et al. |
| 2003/0128236 | A1 | 7/2003 | Chen |
| 2003/0204449 | A1* | 10/2003 | Kotas et al. ................... 705/27 |
| 2003/0208409 | A1 | 11/2003 | Mault |
| 2004/0205286 | A1 | 10/2004 | Bryant et al. |
| 2005/0033683 | A1* | 2/2005 | Sacco ................... G06Q 30/06 705/37 |
| 2005/0162523 | A1 | 7/2005 | Darrell et al. |
| 2005/0283379 | A1 | 12/2005 | Reber |
| 2006/0116935 | A1 | 6/2006 | Evans |
| 2006/0253790 | A1 | 11/2006 | Ramarajan et al. |
| 2006/0288023 | A1 | 12/2006 | Szabo |
| 2007/0143184 | A1 | 6/2007 | Szmanda |
| 2007/0174124 | A1* | 7/2007 | Zagofsky ............... G06Q 30/02 705/14.46 |
| 2008/0004981 | A1 | 1/2008 | Gopalpur et al. |
| 2008/0046738 | A1 | 2/2008 | Galloway et al. |
| 2008/0082426 | A1 | 4/2008 | Gokturk et al. |
| 2008/0170810 | A1 | 7/2008 | Wu et al. |
| 2008/0177640 | A1 | 7/2008 | Gokturk et al. |
| 2008/0201368 | A1 | 8/2008 | Lee et al. |
| 2008/0215456 | A1* | 9/2008 | West et al. ................... 705/27 |
| 2008/0222010 | A1 | 9/2008 | Hudak et al. |
| 2008/0256044 | A1 | 10/2008 | Anderson et al. |
| 2008/0288338 | A1 | 11/2008 | Wiseman et al. |
| 2009/0006374 | A1 | 1/2009 | Kim et al. |
| 2009/0012878 | A1 | 1/2009 | Tedesco et al. |
| 2009/0018996 | A1 | 1/2009 | Hunt et al. |
| 2009/0157522 | A1 | 6/2009 | Srinivasan et al. |
| 2009/0248626 | A1 | 10/2009 | Miller |
| 2009/0271270 | A1 | 10/2009 | Regmi et al. |
| 2009/0325554 | A1 | 12/2009 | Reber |
| 2010/0015960 | A1 | 1/2010 | Reber |
| 2010/0015961 | A1 | 1/2010 | Reber |
| 2010/0015962 | A1 | 1/2010 | Reber |
| 2010/0083191 | A1* | 4/2010 | Marshall ................... 715/863 |
| 2010/0114736 | A1* | 5/2010 | Lewis et al. ................... 705/27 |
| 2010/0241650 | A1 | 9/2010 | Chittar |
| 2011/0029334 | A1 | 2/2011 | Reber |
| 2011/0054960 | A1 | 3/2011 | Bhatia et al. |
| 2011/0213679 | A1 | 9/2011 | Petkov et al. |
| 2013/0073410 | A1* | 3/2013 | Bhogal ............... G06Q 30/08 705/26.3 |

OTHER PUBLICATIONS

"U.S. Appl. No. 12/259,955, Non Final Office Action dated Aug. 18, 2014", 22 pgs.

"U.S. Appl. No. 12/259,955, Non Final Office Action dated Nov. 22, 2013", 22 pgs.

"U.S. Appl. No. 12/259,955, Response filed Apr. 22, 2014 to Non Final Office Action dated Nov. 22, 2014", 17 pgs.

"U.S. Appl. No. 12/259,955, Response filed Oct. 21, 2013 to Final Office Action dated Jun. 19, 2013", 14 pgs.

"U.S. Appl. No. 12/259,955, Response filed Dec. 18, 2014 to Non Final Office Action dated Aug. 18, 2014", 17 pgs.

"U.S. Appl. No. 13/032,338, Non Final Office Action dated Apr. 7, 2014", 19 pgs.

"U.S. Appl. No. 13/032,338, Non Final Office Action dated Nov. 28, 2014", 16 pgs.

"U.S. Appl. No. 13/032,338, Response filed Aug. 7, 2014 to Non Final Office Action dated Apr. 7, 2014", 15 pgs.

"U.S. Appl. No. 13/032,338, Response filed Oct. 7, 2013 to Final Office Action dated Jul. 5, 2013", 8 pgs.

"U.S. Appl. No. 13/032,338, Supplemental Amendment filed Aug. 25, 2014", 8 pgs.

"2008 Toyota Corolla CE", http://autos.yahoo.com/toyota_corolla_ce/, Yahoo Autos, (2007).

"U.S. Appl. No. 12/259,955 Non-Final Office Action dated Sep. 3, 2010", 18 pgs.

"U.S. Appl. No. 12/259,955, Final Office Action dated Feb. 11, 2011", 20 pgs.

"U.S. Appl. No. 12/259,955, Non Final Office Action dated Sep. 21, 2011", 24 pgs.

"U.S. Appl. No. 12/259,955, Response filed Jan. 3, 2011 to Non Final Office Action dated Sep. 3, 2010", 12 pgs.

"U.S. Appl. No. 12/259,955, Response filed Jan. 20, 2012 to Non Final Office Action dated Sep. 21, 2011", 14 pgs.

"U.S. Appl. No. 12/259,955, Response filed Jun. 10, 2011 to Final Office Action dated Feb. 11, 2011", 13 pgs.

"U.S. Appl. No. 12/259,955, Response filed Aug. 18, 2010 to Restriction Requirement dated Jun. 18, 2010", 6 pgs.

"U.S. Appl. No. 12/259,955, Restriction Requirement dated Jun. 18, 2010", 6 Pgs.

"Autobytel's Estimated Market Price—EMP—Moves Beyond MSRP and Invoice Pricing to Address Age-Old Car Shopper Question: "How Much Should I Really Expect to Pay for That Car?"", Business Wire, (Nov. 19. 2002).

"CarTradeIndia.com", http://www.cartradeindia.com/, (Copyright 2006-2007).

"CarWale.com", http://www.carwale.com, (Downloaded Nov. 21, 2007).

"First Choice (formerly Automartindia)", http://www.automartindia.com, (Copyright 2001).

"International Application Serial No. PCT/US11/26114, Search Report dated Apr. 25, 2011", 4 Pgs.

"Kelly Blue Book", http://www.kbb.com, (Downloaded Nov. 21, 2007).

"Maruti Suzuki", http://www.marutitruevalue.com/MyCarDetails.asp, Maruti Suzuki India Ltd., (Downloaded Nov. 21, 2007).

"U.S. Appl. No. 12/259,955, Final Office Action dated Jun. 19, 2013", 21 pgs.

"U.S. Appl. No. 13/032,338, Final Office Action dated Jul. 5, 2013", 18 pgs.

"U.S. Appl. No. 12/259,955, Final Office Action dated Apr. 27, 2015", 8 pgs.

"U.S. Appl. No. 13/032,338, Non Final Office Action dated May 6, 2015", 21 pgs.

"U.S. Appl. No. 13/032,338, Response filed Mar. 30, 2015 to Non Final Office Action dated Nov. 28, 2014", 24 pgs.

"U.S. Appl. No. 12/259,955, Non Final Office Action dated Oct. 7, 2015", 14 pgs.

"U.S. Appl. No. 12/259,955, Response filed Aug. 27, 2015 to Final Office Action dated Apr. 27, 2015", 27 pgs.

"U.S. Appl. No. 13/032,328, Response filed Nov. 6, 2015 to Non Final Office Action dated May 6, 2015", 17 pgs.

"U.S. Appl. No. 13/032,338, Advisory Action dated Mar. 31, 2016", 3 pgs.

"U.S. Appl. No. 13/032,338, Final Office Action dated Jan. 21, 2016", 20 pgs.

"U.S. Appl. No. 13/032,338, Response filed Mar. 21, 2016 to Final Office Action dated Jan. 21, 2016", 13 pgs.

"U.S. Appl. No. 12/262,012 Non-Final Office Action dated Aug. 20, 2010", 14 pgs.

"U.S. Appl. No. 12/262,012, Notice of Allowance dated Mar. 25, 2011", 13 pgs.

"U.S. Appl. No. 12/262,012, Response filed Dec. 20, 2010 to Non Final Office Action dated Aug. 20, 2010", 14 pgs.

"EBay Launches New Mobile Application for Consumers in Europe", [Online]. Retrieved from the internet: <URL: http://investor.ebay.com/releasedetail.cfm?ReleaseID=336380>, (2008), 1 pg.

(56) References Cited

OTHER PUBLICATIONS

"International Application Serial No. PCT/US2011/26114, Written Opinion dated Apr. 25, 2011", 16 pgs.
"S60 Camera Phones Get Image Recognition Technology", [Online]. Retrieved from the Internet: <URL: http://news.softpedia.com/news/S60-Camera-Phones-Get-Image-Recognition-Technology-79666.shtml>, (Feb. 27, 2008), 2 pgs.
"SnapTell: Technology", [Online]. Retrieved from the Internet: <URL: http://web.archive.org/web/20071117023817/http://www.snaptell.com/technology/index.htm> (Nov. 17, 2007), 1 pg.
"The ESP Game", [Online]. Retrieved from the Internet: <URL: http://www.espgame.org/instructions.html>, (Accessed Nov. 13, 2007), 2 pgs.
Gonsalves, Antone, "Amazon Launches Experimental Mobile Shopping Feature", [Online]. Retrieved from the Internet: <URL: http://www.informationweek.com/news/internet/retail/showArticle.jhtml?articleID=212201750&subSection=News>, (Dec. 3, 2008), 1 pg.
Patterson, Ben, "Amazon iPhone app takes snapshots, looks for a match", [Online]. Retrieved from the Internet: <URL: http://tech.yahoo.com/blogs/patterson/30983>, (Dec. 3, 2008), 3 pgs.
Terada, S., "New cell phone services tap image-recognition technologies", [Online]. Retrieved from the Internet: <URL: http://search.japantimes.co.jp/cgi-bin/nb20070626a1.html>, (Jun. 26, 2007), 3 pgs.
Von Ahn, Luis, et al., "Labeling images with a computer game", Proceedings of the SIGCHI Conference on Human Factors in Computing Systems, (2004), 319-326.

\* cited by examiner

US 9,934,522 B2

SYSTEMS AND METHODS FOR BATCH-LISTING ITEMS STORED OFFLINE ON A MOBILE DEVICE

FIELD

This application relates generally to data processing, and more specifically to systems and methods for batch-listing, on a publication system, items that have been previously stored offline on a mobile device. The mobile device may be camera enabled. A publication system may be an electronic marketplace, sometimes referred to herein merely as a marketplace. The terms publication system, marketplace, and electronic marketplace may be used interchangeably herein, and the terms "sale items" and "items" may be used interchangeably herein, both without limiting the scope of the claims.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, EBAY, INC., All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Mobile devices, which may be camera enabled (such as cellular telephones), have become very popular in recent years. A mobile device which may be camera enabled may be capable of communicating data (e.g., an image file) over wireless data networks.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
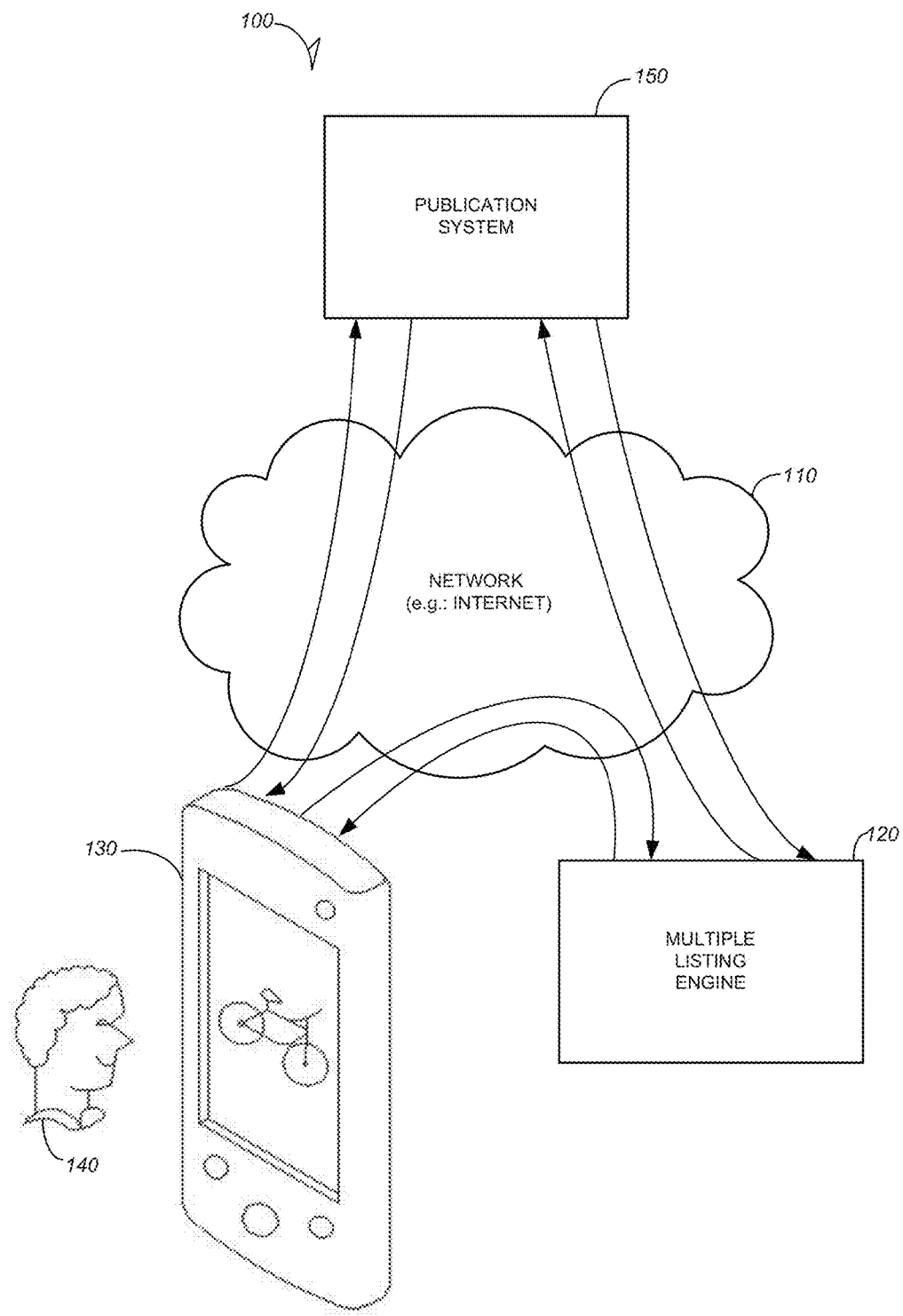
FIG. 1 is a block diagram illustrating an architecture within which systems and methods for listing items stored offline on a mobile device may be implemented, in accordance with an example embodiment.

For some example embodiments, systems and methods for creating marketplace listings using a mobile device, which may be camera enabled, are disclosed. One example embodiment may comprise receiving a request via a mobile device to batch-list sale items that have been stored on the mobile device offline. The sale items may have associated therewith images having the one or more sale items, the images being taken by the mobile device or by other devices and may include listing data associated with the one or more sale items. Based on the data, the one or more sale items may be listed on a marketplace. However, the user of the mobile device may not want to list the items already stored on the mobile device until he or she has information about the amount of proceeds that may be received from the sale of the items. To help the user (e.g., a potential seller) decide whether to list some or all of the items, a price estimation application may be made available to the user to provide an approximation of the amount of money the user would receive if the user sold some or all of the items. Based on this approximation, the user may decide to list one, some, or all of the items.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents, if any, referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

A mobile device which may be camera enabled may include a mobile Operating System (OS) run on a hardware platform adapted for the OS. Such a mobile device may include a Graphical User Interface (GUI), which may be based on the concept of direct manipulation of a touch screen monitor with gestures. The GUI may permit a nearly instantaneous response to user input. The gestures for interaction with the mobile OS may include swiping, tapping, pinching, and/or reverse pinching.

For some example embodiments, systems and methods for marketplace listings using a mobile device which may be camera enabled may permit a user to take one or more pictures illustrating items to be listed on a marketplace and provide data related to the pictures. In another embodiment, the pictures may have been taken by another device and subsequently stored on the mobile device. The data may be utilized to tag the items to be listed. The items may be extracted from the pictures, tagged with the data, and listed at the same time. A software application running on the mobile device may utilize rich media technology to enable a user to take multiple pictures of various items or a single picture of a group of multiple items, tag the items with data, store the foregoing, and later list the items for sale on a marketplace. For example, in some example embodiments, a draft area may be utilized as an intermediary stage for images and data to be collected over a period of time before the data is associated with the items in the images and listed on a marketplace. In some embodiments the draft area may be on the mobile device. In other embodiments the draft area may be on a server. In some instances, the items may be a single item or "multi-quantity fixed price" items where a seller is selling a number of identical items for a fixed price for each of the items. For example a seller may list 100 sprockets for $100 each that can be sold to one buyer or up to 100 separate buyers. This may be implemented multiple listings or in a single listing.

For some example embodiments a price estimation module may be provided to estimate the price for which the items, or types of Items, may sell. A graphical user interface may be provided to the user of an online publication system, the graphical user interface to display the prices, which may be average or median prices, of items to the user. The user may select the prices of the item or items respectively most similar to the items that are stored offline on the mobile device. The user may also provide to the publication system the number of each type of items stored. The publication system may provide for multiplying the price estimate for the selected listings by the number of items to provide the user with an estimation of the proceeds from sales of the items. Based on this information, the user may decide to go forward and list one of the items, or may list more than one, or even all, of the types of items that had been stored offline in the mobile device in a batch-listing process.

FIG. 1 illustrates a network environment 100 that may include a network 110, a multiple listing engine 120, or listing module, a mobile device which may be camera enabled 130, a user 140, and a publication system 150 such as an electronic marketplace. The network 110 may comprise a plurality of data processing nodes interconnected for the purpose of data communication. The mobile device 130 may comprise a camera coupled to a mobile device. The mobile device 130, in some example embodiments, may include a Graphical User Interface (GUI) which may be manipulated by gestures of a hand of the user 140 hand. In a typical GUI, instead of offering only text menus or requiring typed commands, the system presents graphical icons, visual indicators, or special graphical elements called widgets that may be utilized to allow the user 140 to interact with client applications. The mobile device 130 may be configured to utilize icons in conjunction with text, labels, or text navigation to represent the information and actions available to users. Example GUI and client applications are described in more detail with reference to FIG. 3.

The user 140 is a person interacting with the mobile device 130, which may be camera enabled, via the GUI. In some other embodiments, the user 140 may be represented by an automated process designed to simulate a person operating the mobile device 130. The electronic marketplace 150, in the context of the example network environment 100, may be an online auction and fixed price shopping website configured to permit individual users and businesses to buy and sell goods and services (e.g., eBay). The publication system 150 may be a part of the worldwide electronic commerce which includes buying and selling of products or services over electronic systems such as the Internet and other computer networks. The multiple listing engine 120, in some example embodiments, may include various components facilitating listing of items for sale. A system for marketplace listings using a mobile device which may be camera enabled 200 is described by way of example with reference to FIG. 2.

Figure 2A:
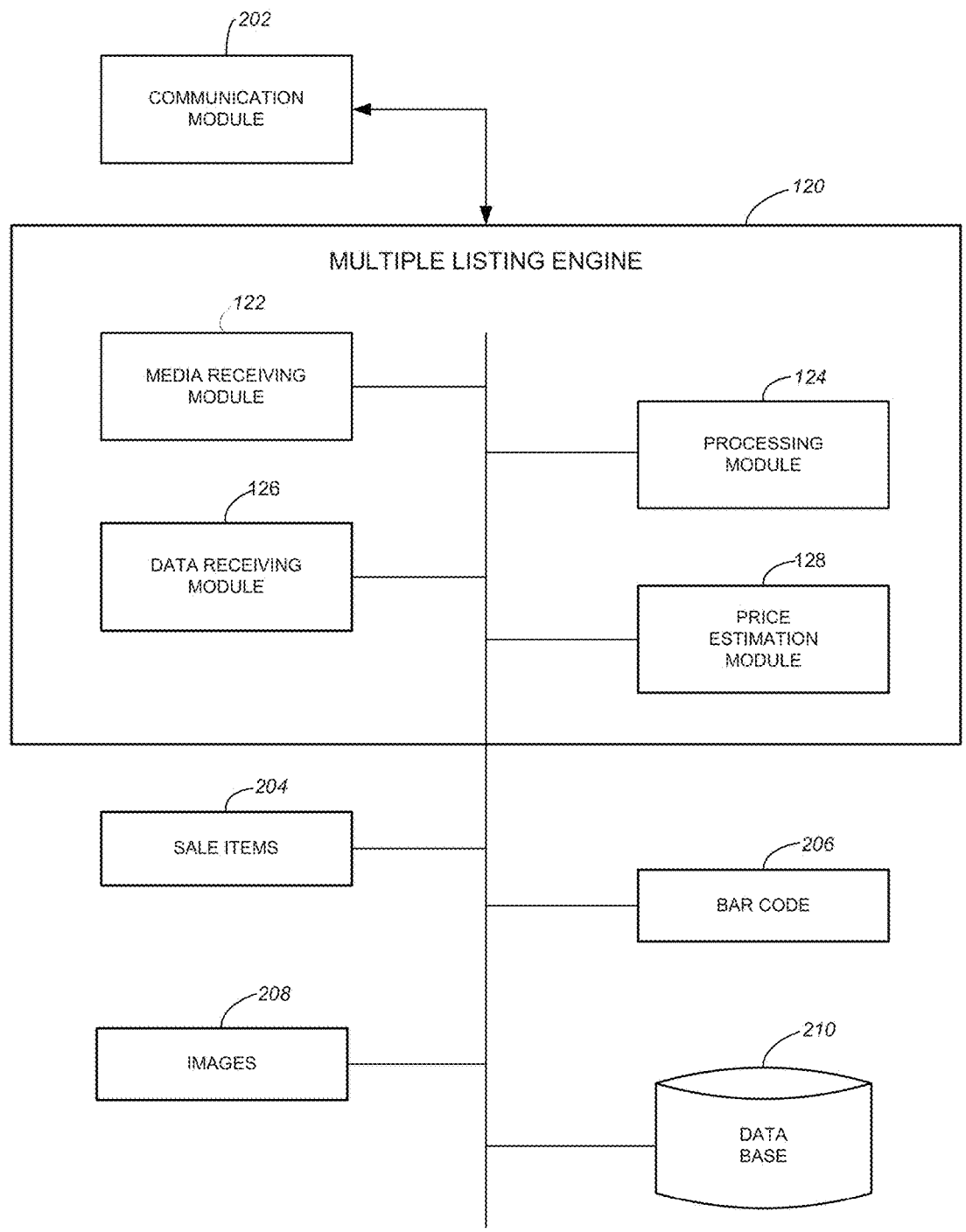
FIG. 2A is a block diagram showing a multiple listing engine, in accordance with an example embodiment.

FIG. 2A is a block diagram showing the system for marketplace listings using such a mobile device in accordance with an example embodiment. The system for marketplace listings using such a mobile device in some example embodiments may include a communication module 202 coupled to a multiple listing engine 120. The system for marketplace listings using such a mobile device may further include sale items 204, a bar code 206, images 208, and a database 210.

The communication module 202, in some example embodiments, may be configured to receive a request from the mobile device 130 to list one or more of the sale items 204 selected by the user 140 from the images 208. For some example embodiments, interaction of the user 140 may not be needed because the sale items 204 are selected based on predetermined default criteria. The communication module 202 may be coupled to the multiple listing engine 120, which in turn may include a media receiving module 122, a processing module 124, a data receiving module 126, and a price estimation module 128.

Embodiments of a price estimation module 128 may include a method comprising selecting a category from a catalogue hierarchy used by an online publication system, the selected category being one of a plurality of categories assigned to listings describing an item for sale; filtering listings within the selected category to select a set of filtered listings; applying a decay formula to each filtered listing of the set of filtered listings; selecting one or more of the filtered listings based on a ranking of the filtered listings; and providing a graphical user interface to a user of an online publication system, the graphical user interface to display the selected filtered listings to the user as discussed above. The user may select the listing or listings respectively most similar to the items, or types of items, that had been stored offline on the mobile device. The user may also provide to the publication system the number of each type of items stored. The system my provide for multiplying the price estimate for the selected listings by the number of items of each type to provide the user with an estimation of the proceeds from prospective sales of the items. Based on this information, the user may decide to go forward and may list one of the types of items, or may list more than one, or even all, of the types of items that had been stored offline in the mobile device. More detailed operation of an exemplary price estimation module 128 may be seen in U.S. patent application Ser. No. 13/032,338 filed Feb. 22, 2011, entitled, "Multi-Quantity fixed Price Referral Systems and Methods." Although the method of the foregoing patent application is operable for multi-quantity situations, those of ordinary skill in the art will recognize that it may also be applied to single quantity situations. The salient parts of the above application are seen next below.

Figure 2B:
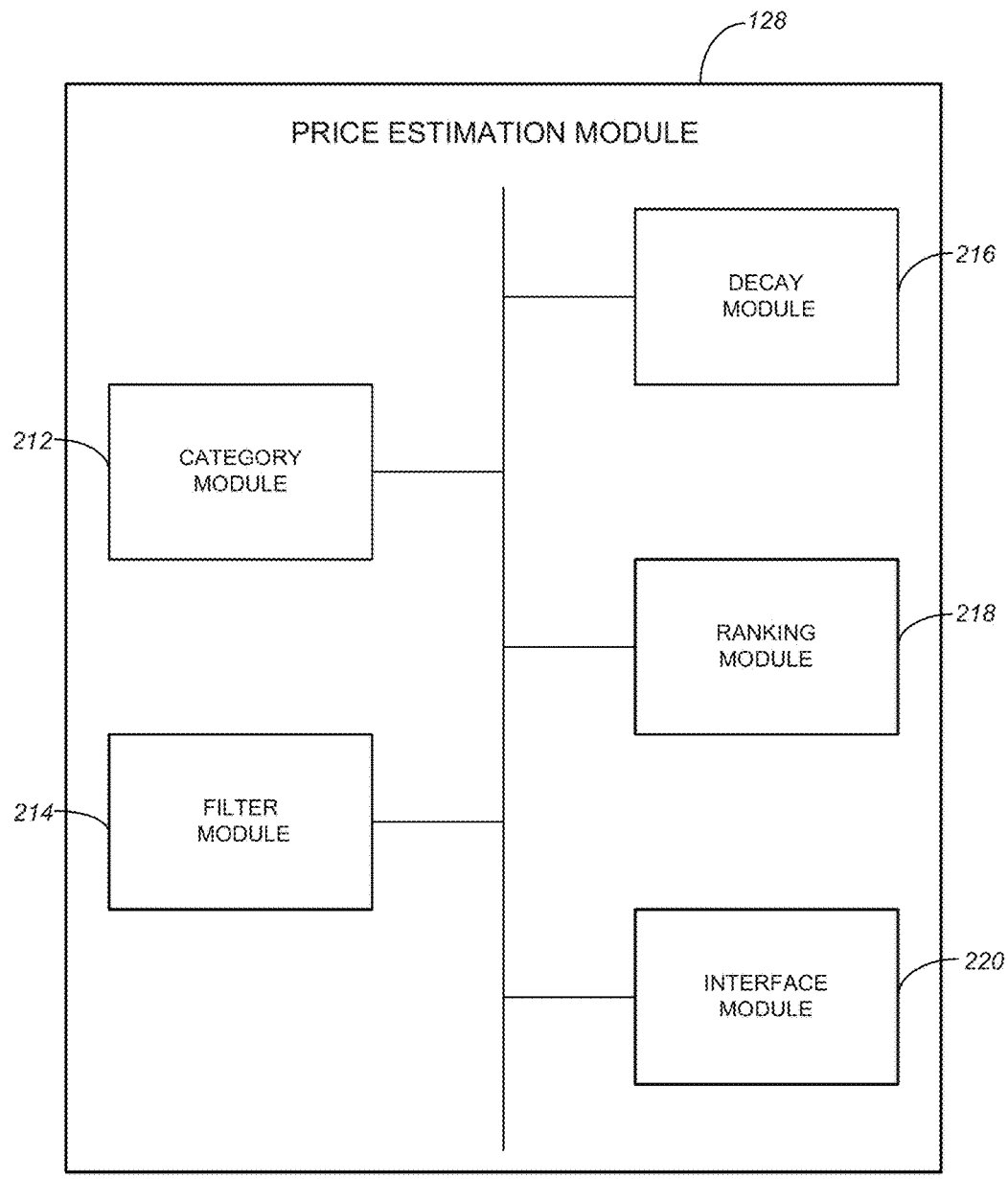
FIG. 2B is a block diagram showing a price estimating module.

FIG. 2B illustrates an example price estimation module 128 according to various embodiments. The price estimation module 128 may be implemented in hardware, software, or a combination thereof.

A category module 212 is configured to access a catalogue hierarchy from the online publication system that is used by the online publication system to categorize listings that describe items or services. The catalogue hierarchy comprises a hierarchy having parent categories that may include a number of child categories. In some instances, a child category itself may include one or more child categories. Using the predefined catalogue hierarchy, the listings themselves may be assigned to child categories that do not include further child categories.

A category of a listing may refer to a parent category or to a child category within the catalogue hierarchy. For example, a parent category of a catalogue hierarchy may be "photography" and a child category may be "digital cameras." As such, a listing describing an instance of a digital camera may be categorized as both "photography" and a "digital camera."

The category module 212 is further configured to select categories to be used by the price estimation module 128 without affecting the catalogue hierarchy itself. To price-estimate a diverse selection of listings across several categories, the price estimation module 128 may select categories by preserving certain categories and combining other categories. The category module 212 identifies one or more "Level One" categories in the catalogue hierarchy. The Level One categories are the categories that are not a child category of another category. Stated another way, the Level One categories are the highest categories in the catalogue hierarchy. The Level One categories respectively include one or more child categories, referred to as "Level Two" categories. As described in further detail in connection the technique discussed below, for each Level One category, the sales in each Level Two category is compared to a threshold. If the threshold is met, the Level Two category is selected. If the threshold is not met, the Level Two category is combined with the other Level Two categories for the Level One category that do not meet the threshold.

A filter module 214 is configured to filter the listings according to one or more factors using one or more filters. The filters may be applied to ensure that a diverse selection of listings across, for example, a price range is price-estimated without favoring low-priced or recently added listings. The filters may include, but are not limited to, price, seller reputation, sale format, quantity available for sale, a number of sales or impressions, and/or the country where the item is being sold. An example of the filter module 214 is discussed further in connection with FIG. 2C.

A decay module 216 is configured to ensure that the listings are current by applying a decay formula to the listings in the filtered set of listings. The decay formula is applied to the number of sales or impressions associated with the listing to provide a discounted number of sales and a discounted number of impressions for each respective listing. An impression occurs when a user views the listing. The decay formula is used to discount the number of sales or impressions that occurred more than a pre-defined period of time in the past. The decay formula prevents listings for items that were once popular, but are no longer so popular, from being price-estimated.

The ranking module 218 is configured to rank the listings in the filtered set according to a ratio of the number of sales to the number of impressions. The ranking may be performed using the discounted number of sales and the discounted number of impressions. The listings within the identified categories corresponding to the highest ratio are then selected to be price-estimated to users of the online publication system.

The interface module 220 is configured to provide a graphical user interface to a user of the online publication system. The graphical user interface may display the selected filtered listings to the user. The provided graphical user interface may be a portion of a larger interface ultimately rendered to the user or may include additional elements.

An example technique performed by the price estimation module 128 according to various embodiments will now be described. The technique is performed within the publication system 150 to identify listings to be price-estimated to users of the publication system 150. The technique may be performed at a predefined interval or in response to a user input.

In an operation, one or more categories may be selected based on an existing hierarchy used by the publication system 150 to categorize the items described in the listings. In some instances, the selection may be performed by the category module 212 within the price estimation module 128.

Figure 2C:
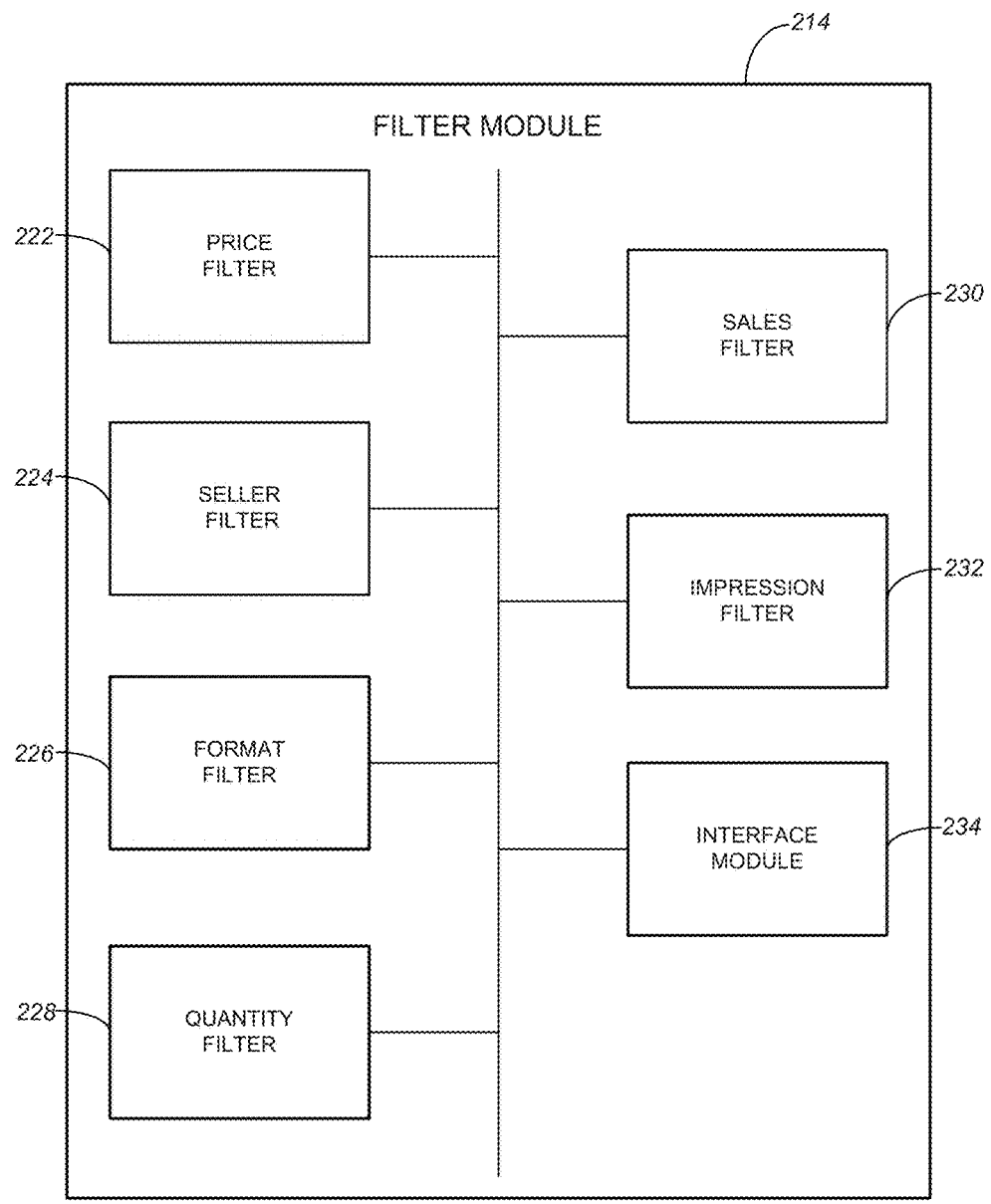
FIG. 2C is a block diagram showing a filter module useful in a price estimation module.

Once the categories are identified, the listings are filtered to identify a filtered set of listings that are desirable for being price-estimated by the price estimate module 128. An example filter module 214 may perform the filtering operation and is depicted in FIG. 2C.

When the listings within a category (or across the categories) have been filtered to produce a filtered set of listings, a decay formula may be applied to the respective listings. The operation may be performed by the decay module 216 in the price estimate module 128. The decay formula is applied to the number of sales and/or the number of impressions associated with the listing (or re-listings of the listing) to calculate a discounted number of sales (or impressions). In some embodiments, the accumulated number of sales (or impressions) are decayed over time using the formula:

$$2^{(-t/7)}$$

where t is the age of each sale in days. As such, according to this formula, each sale is discounted by half in a week. The decay formula may be modified based on the number of sales (or impressions) in the category over a pre-defined period of time or other factors. The discounted number of sales and the discounted number of impressions may be useful where an item is popular for a short period of time such as an item associated with a popular movie or a holiday.

The price estimation module 128 may rank the listings in each category by its respective sales per impression ratio using the ranking module 218. The listings may be part of a filtered set of listings and/or be associated with a discounted number of sales or impressions as described below. A listing, or a pre-defined quantity of the listings, associated with the highest sales per impression ratio within a category are selected to be price-estimated within the online publication system. For example, the predefined quantity of listings may be twenty listings within each category. This number may be adjusted based on, for example, the number of listings in the category or the velocity of sales within the category.

One or more ranking mechanisms may be applied by the ranking module 218 depending on characteristics of the buyer or the seller. In one example, the price estimation module 128 may price-estimate only those listings viewed or purchased from by top buyers if the user is a top buyer. A top buyer is identified based on a number of transactions or by a transaction volume in a given time period. In another example, the price estimation module 128 may operate to price-estimate a different number of items for each category depending on users' purchase history. For example, if a user searches the category "Clothing, Shoes, and Accessories" 90% of the time, the filters may price-estimate the top 20 items in that category, but only the top 5 items in other categories. In another instance, for sellers that mostly sell to top buyers, listings that are currently popular among these buyers may be price-estimated to these sellers. By doing so, these sellers can identify inventory to list in the online publication system. After the listings are ranked, one or more of the filtered listings are selected based, at least in part, on the ranking.

The following example technique for identifying categories according to various embodiments may be used where the publication system 150 includes a catalogue hierarchy. The catalogue hierarchy includes multiple levels where objects in higher levels (with Level One being the highest) group objects in lower level categories. The technique may be repeated for each lower level category within the Level One categories of the catalogue hierarchy.

In one operation of the technique, a Level One category of the catalogue hierarchy is identified. In one example, the catalogue hierarchy may include thirty to forty Level One categories. The Level One categories include, for example, "Camera and Photo," "Cell Phones and PDAs," "Health and Beauty," and "Home and Garden."

For example, a Level Two category below the Level One category may be identified. The catalogue hierarchy may include hundreds or thousands of Level Two categories, each associated with a Level One category. To illustrate, the Level One category, "Cameras and Photo" may include "Binoculars and Telescopes," "Camcorders," and "Digital Cameras." For each identified Level Two category, an operation to determine whether there are sales in Level Two greater than the threshold may be performed. If yes, the Level Two category may be preserved. If no, then the Level Two category may be included in the Level One category. These operations may be repeated for Level Three categories and below, if desired.

In another operation, a determination whether the sales in the Level Two category account for more than a predetermined threshold (e.g., 0.4%) of total sales in the publication system 150. The percentage of total sales may be modified based on various factors such as season, number of categories, total sales volume, and the like. As an example, the percentage of total sales may vary from 0.01% to 10%. The total sales may be calculated over a pre-defined period of time and based on overall number of sates, total revenue generated by the sales for the online publication system, total value of the sales, and other metrics.

If the sales in the Level Two category exceed the predetermined threshold of total sales, the Level Two category may be preserved within the price estimation module 128. To illustrate, if sales of items within the "digital cameras" in the Level Two category exceeds 0.4% (as an example) of all sates in the online publication system, the Level Two category "Digital Cameras" (and the associated listings) is preserved separately from other categories for the purposes of the referral tool system. It is noted that the catalogue hierarchy itself is not affected.

If the sales in the Level One category do not exceed the predetermined threshold of total sales, the Level Two category (and the listings associated with the Level Two category) is added to a general Level One category. The general Level One category and any preserved Level Two categories are not hierarchically related and may be stored as a flat data structure. To illustrate, if sales of items within the "binoculars and telescopes" in the Level Two category do not exceed 0.4% of all sales in the online publication system, the Level Two category "Binoculars and Telescopes" (and the associated listings) is rolled into a general Level One category, "Cameras and Photo." Similarly, if sales of items within "camcorders" in the Level Two category do not exceed 0.4% of all sales in the online publication system, the Level Two category "Camcorders" (and the associated listings) is rolled into the same general Level One category, "Cameras and Photo" for ranking by the referral tool system. It is noted that the catalogue hierarchy itself remains unchanged.

The filtering of operation may be performed by one or more filters within a filter module 214 shown in FIG. 2C. The filter module 214 of FIG. 2C is an example of the filter module 214 of FIG. 2B. The filter module 214 includes a number of filters such as a price filter 222, a seller filter 224, a format filter 226, a quantity filter 228, a sales filter 230, an impression filter 232, and a country filter 234. The price filter 222 may calculates an average price usable by user 140 of FIG. 1.

An alternate price estimation module 128 may be seen in U.S. patent application Ser. No. 12/259,955 filed Feb. 22, 2011, entitled, "Estimating Vehicle Prices Using Market Data" for situations in which the items may be or include automobiles or other vehicles. Although the method of the foregoing patent application is operable for vehicle pricing situations, those of ordinary skill in the art will recognize that it may also be applied to other items useful in the embodiments described herein. The salient parts of the above application are seen next below.

Figure 7:
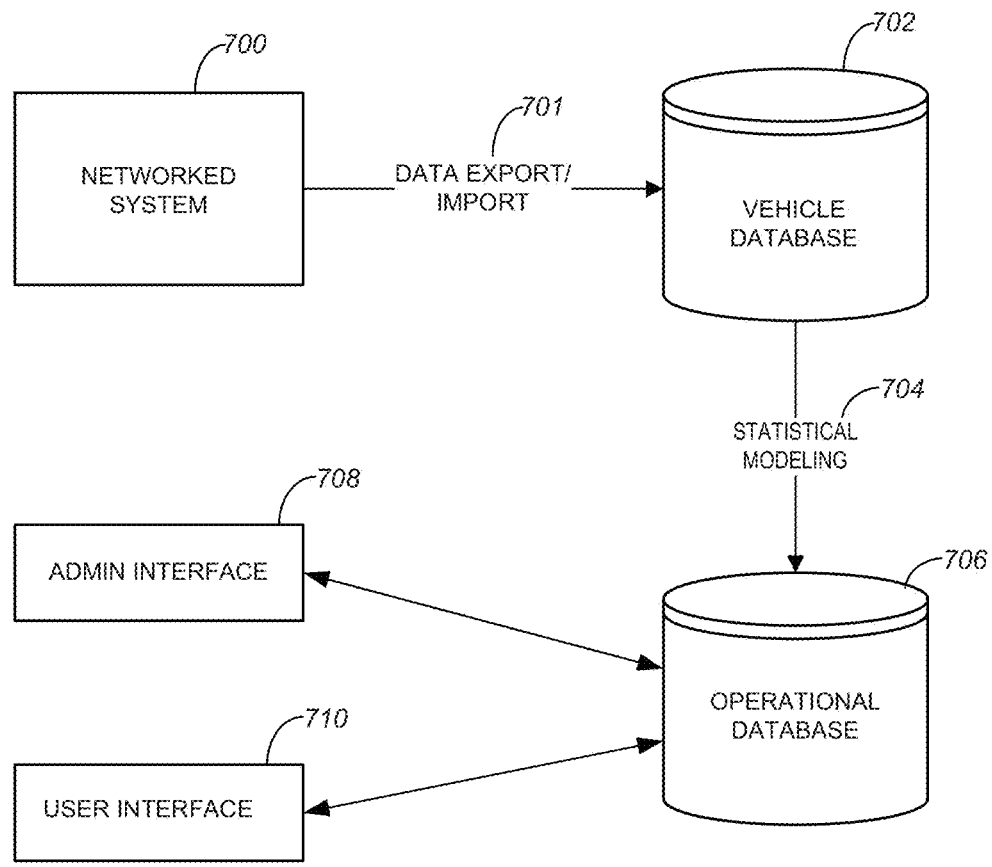
FIG. 7 is a data flow diagram of a network system, including price estimation, according to an example embodiment.

FIG. 7 is a data flow diagram illustrating data and control flow within a network system, according to an example embodiment. Auctions for vehicles can be conducted using the networked system 700 which may be, or may be part of publication system 150 of FIG. 1. Auctions may include various vehicle types, such as cars, trucks, sports utility vehicles, two-wheel vehicles (e.g., motorcycles), commercial vehicles, construction vehicles and equipment, three-wheel vehicles, and tractors. In an embodiment, used vehicle price data is the outcome of online auctions of vehicles with registered dealers vying for each vehicle.

At 701, data is exported from the networked system 700 and imported into a vehicle database 702. Data may be exported from the networked system 700 using various methods, such as a comma separated value (CSV) file, a database replication operation, a database query, or formatted data output (e.g., using eXtended Markup Language (XML)). The data export/import operation 701 may include sub-operations, such as checks for data consistency, data formatting or conditioning, and data normalization (e.g., removing outlier data points). Data exporting may be performed at regular or periodic intervals, or on-demand, in various embodiments.

In an embodiment, the vehicle database 702 may be configured to store data related to vehicles auctioned in the networked system 700, general vehicle information (e.g., make, model, year, type, options), and historical vehicle information. The vehicle database 702 may also be configured to store auction-related vehicle information, such as a start date and time, an end date and time, a starting price, a final price, a reserve price, a number of bids, a number of bidders, financing terms, a seller, or a buyer.

Using the data stored in the vehicle database 702, a statistical modeling operation 704 is conducted to calculate prices of vehicles included in the vehicle database 702. The statistical modeling operation 704 may be performed by a statistical modeling module (not shown) in publication system 150 and may perform various operations, such as aggregating or organizing price data across a market segment, calculating price ranges for model variants, or calculating prices based on other factors, such as vehicle location, age, taxes, depreciation, condition, and options. The calculated price data is stored in the operational database 706 to be accessed by administrative users via the admin interface 708, or end users via the user interface 710.

Administrative users may control various aspects of the end user's user interface 710, such as the availability or configuration of user interfaces, graphical output (e.g., chart, graph, matrix, formatted list), or data subsets. As an example of controlling data subsets, an administrative user may initially limit an end user's access to only four-wheel vehicles. Additional access to three-wheel vehicles may be available at an additional cost. When the end user opts to pay the additional cost, the administrative user may update the configuration of the end user's user interface 710 to display the additional content. Similarly, other data subsets may be presented or withheld from an end user. For example, some model years may be available for an extra charge or a premium subscription. As another example, a basic service may only provide individual pricing estimates, while a higher-level service may provide estimates of several vehicles for comparison in a formatted output.

The user interface 710 need not be limited to an electronic medium. In various embodiments, the user interface 710 includes a printed publication (e.g., a magazine, letter, pamphlet, booklet, etc.), an Internet-based application (e.g., a website, a phone-based application (e.g., a toll-free number), or a mobile-based solution (e SMS messaging, mobile web access). In an embodiment, the user interface 710 may be configured to provide more than one method of accessing the available information. For example, a user may access vehicle information via a subscriber website in addition to regular updates via a monthly newsletter.

All or part of the networked system 700, according to an example embodiment, may process data and estimate vehicle prices according to the data processing flow illustrated in FIG. 7. A data exporter component may export auction transaction data. The data exporter component may include, be a component of, or be equivalent to the networked system 700, as illustrated in FIG. 7, in various embodiments. A data processor may process the auction transaction data. Various statistical, mathematical, arithmetical, or organizational data manipulation may be performed by the data processor to transform the exported data. Some examples of such operations may be performed by the statistical modeling application. For example, the data processor may filter, condition, aggregate, or model the auction transaction data, in various embodiments. A data presenter component may access the data processed by the data processor and present it to a user. The data presenter may include, be a component of or be equivalent to the user interface 710, in various embodiments.

A method, according to an example embodiment, of using auction data to estimate vehicle prices may include accessing auction transaction data. The auction transaction data may include auction information, vehicle information, or transaction information, in various embodiments. Auction information may include listing information, initial auction price, auction closing price, transaction costs, and other information related to in-progress, closed, completed, or abandoned vehicle auctions. Vehicle information may be obtained from one or more database records that describe a previously-conducted auction for a used commercial vehicle. The database records may include vehicle characteristics, such as mileage, condition, vehicle manufacturer, make, model, variant, trim, engine, options, and the like. In addition, the database records may include transaction information related to the listing, such as a seller, a buyer, an initial auction price, a closing price, a reserve price, a bid history, a tax, a transaction surcharge, or other transaction costs. The data records may be stored in various formats, such as an relational database, an object oriented database, a flat file database, a spreadsheet, a comma delimited value file, a structured file (e.g., an extensible markup language (XML) file), and other storage formats.

The auction transaction data may be processed. Processing may include several actions, such as filtering, conditioning, aggregating, and modeling. In an embodiment, the filtering process may be implemented to remove outlying data points—those data points that are statistical anomalies—to improve statistical accuracy. The acceptable range of data, such as the sale price of a vehicle, may be statistically determined or optionally, is manually or semi-manually configurable. In an embodiment, the filtering process may be implemented to selectively retain or exclude data based on an auction characteristic. For example, a database may be designed for a particular geographic region (e.g., a country or state), such that the filtering process is implemented to retain data for auctions that were conducted with a seller and/or buyer in the particular geographic region. In an embodiment, the filtering process may be implemented to selectively retain or exclude data based on a vehicle characteristic. For example, a database may be designed exclusively for commercial vehicle auctions. As such, recreational, non-commercial, and consumer-oriented vehicle listings or auctions may be excluded from the commercial vehicle database.

In an embodiment, the conditioning process may be implemented to check for data consistency and format data to adhere to a consistent usage. For example, string values may be truncated or padded to fit a fixed-field size. As another example, currencies may be revised to represent a particular common currency based on an exchange rate (e.g., the exchange rate at the time of the end of the auction).

In an embodiment, the aggregation process may be implemented to combine auction transaction data. For example, similar or related auction transaction data may be aggregated before statistical modeling is performed. This may be done for several reasons, such as, to gather enough sample points to make a statistically relevant data point or result, compare logical divisions or groupings to one another, or to normalize data groups.

In an embodiment, the modeling process may be implemented to perform one or more statistical operations on the auction transaction data. For example, linear or exponential regression, or mean analysis may be used to determine an estimated price, price plot, or price range of a vehicle. Estimated prices may include past, present, or future values or prices. Other types of statistical operations, such as logarithmic decay to estimate depreciated residual values, extrapolation to estimate future value, or interpolation to estimate missing or underrepresented intermediate data points, may be applied, for example.

In an example embodiment, whether regression analysis is performed or mean analysis is performed depends on two factors: the number of data points and a threshold value. First, the number of data points representing past sales that are available for a selected vehicle make, vehicle model, vehicle variant, and location (e.g., city) combination is obtained. In an example embodiment, a number of data points of vehicle sales of a vehicle similar to the selected vehicle are also determined. Then, using a threshold value, either regression (e.g., linear or exponential) is used or mean analysis is used to estimate a vehicle price.

If regression is used, then in an example embodiment, another filter is applied to check the validity of the regression technique. As an example, a standard technique, such as the "F-Test" may be used to assess the overall validity of the regression model. If the test indicates that the model is valid, then regression is used; otherwise, a mean analysis is used to estimate the vehicle price.

The output of the processing may include an estimate of a past, present, or future vehicle price, in various embodiments. The output may be expressed as a range. Additionally, the output may be expressed as a single value with associated upper and lower limits defining a range of confidence. For example, an estimated future price of a used vehicle may be expressed as 45,000 rupees ("Rs."), +/−3,000 Rs., where 3,000 Rs. is the confidence interval.

The processed auction transaction data may be stored. The processed data may be stored in one or more databases. Databases may include relational database, flat file databases, spreadsheets, and the like. Processed data may also be stored in a non-electronic form, such as a booklet, pamphlet, or other physical medium. The processed data may be stored in a raw state (e.g., unprocessed data), in an intermediate state (e.g., partially processed data), or a final state (e.g., fully processed data), or any combination of states. Storing data in a partially or fully-processed state may reduce data access latency; however, some data transparency may be lost.

The processed auction transaction data may be presented. In an embodiment, the auction transaction data is used to provide several different vehicle prices, such as an estimated present and future price. Presentation of the processed auction transaction data may take one of several forms, including electronic presentation (e.g., a webpage, a text message, an email, or a voice mail), physical presentation (e.g., a magazine, a newsletter, a book, a pamphlet, or a flyer), or a transmission media (e.g., a live phone call, a radio broadcast, or a cellular broadcast). In an embodiment, a vehicle price is presented using a first plot in a line graph and a second, comparable vehicle is presented using a second plot in the line graph. The line graph may be presented using the various mediums described.

In an embodiment, the data is presented in one or more web pages using graphical elements, such as charts, graphs, or tables. For example, a line graph may be used to illustrate the estimated price of a vehicle over time, e.g., over several model years. As another example, a line graph may be used to illustrate an estimated price of a vehicle and an estimated depreciated residual price over time, e.g., several model years. As other examples, the prices of two or more vehicles, or the estimated depreciated residual prices of two or more vehicles may be displayed for comparative analysis.

The vehicles and/or the depreciated residual prices may be selected, configured, or adjusted by a user, in various embodiments. For example, the user may select a first vehicle and view auction-generated price data associated with the first vehicle. The user may then select one or more additional vehicles to view alongside or in conjunction with the first vehicle's information. In addition, the user may then add depreciated residual information for the first vehicle and/or one or more of the additional vehicles. An example of a user-available adjustment may include a user-selectable depreciation rate (e.g., input by the user using a drop down list, a text field, or other user interface control).

An alternate method according to an example embodiment, of presenting an estimated vehicle price is now presented. One or more parameters are received. In an embodiment, the parameters are received from a user, such as within a browser-based user interface. In an embodiment, the parameters are received in a file or other formatted input (e.g., an XML document or stream) from an automated or semi-automated process. The parameters may include various criteria defining a search request or a search query to be used to search a vehicle database. For example, the parameters may be formatted to include "4W," "Honda," "Accord," "1999," "Andhra Pradesh," and "Eluru," where "4W" indicates a vehicle platform (four-wheel vehicles), "Honda" indicates a vehicle manufacturer, "Accord" indicates a vehicle model, "1999" indicates a model year, and the combination of "Andhra Pradesh" and "Eluru" indicate a price locality of interest. In this example, the requestor is providing a search request for an estimated price form 1999, Honda® Accord®, sold in Eluru, Andhra Pradesh, India.

A search query may be executed. The search query may use one or more parameters provided. In addition, other parameters may be included in the search query. Other parameters may be derived or retrieved from the environment. For example, the search query may be configured using environmental variables available in an online context, such as an internet browser environmental variable, session variable, cookie value, account setting, or the like.

Search results may be analyzed to determine whether a threshold number of results were found. The threshold may be configurable by an administrative user or the end user, in various embodiments. For example, if there are a low number of data points, statistical variation may render any estimated price meaningless; however, an end user may wish to view the calculated result, knowing that the minimal number of data points will affect the outcome and may render the data suspect or useless. In such a case, the user may configure the threshold to be very low, such as one or zero, in order to obtain results even when the results may lack statistical foundation.

In one instance, if less than the threshold number of results were found, then a subsequent search may be performed using a variant of the search parameter. In an embodiment, the variant of the search parameter may include cities or regions that are considered "nearby" or in "close proximity". The distance used to determine whether a city or region is "nearby" or in "close proximity" may be configurable. As an example, a proximity setting may be used to determine which cities are considered in "close proximity," The proximity setting may be represented as a distance value, such as 100 kilometers, as a regional boundary, or a combination of a distances and boundaries.

To continue the example from above, the subsequent search may determine that enough data points exist for the particular vehicle (e.g., Honda® Accord®) in nearby Hyderabad, Andhra Pradesh. As a continuing example, the subsequent search may also determine that another nearby city, Vijayawada, does not have a sufficient number of data points to provide an estimated price. As yet another example, the subsequent search may determine that although no Honda® Accords® are available as price data points in a nearby city, there are similar vehicles, such as Toyota® Camry® of a similar year and equipment package. The subsequent search may then produce the Toyota® Camry® as a comparable vehicle.

To determine comparable vehicles to use in a subsequent search, in an example embodiment, an aspect of a vehicle associated with the initial search parameter is determined. Then, one or more similar vehicles based on the aspect of the vehicle associated with the initial search parameter are identified. These similar vehicles may then be used as the variant of the search parameter. In various embodiments, the aspect of the vehicle associated with the initial search parameter includes one or more of a vehicle classification, a vehicle type, a vehicle model, a vehicle trim, a vehicle segment, a vehicle use, a vehicle competitor, a vehicle price range, or vehicle options.

One or more aspects of the subsequent search may be configurable, in various embodiments. For example, a threshold distance away from the initial city of interest may be configured such that cities that are farther than the threshold distance are not considered "nearby" or in "close proximity" for the purposes of the subsequent search. As another example, nearby cities may be restricted to a particular geographic boundary, such as a state or region. By restricting nearby cities to the same region or state, the subsequent search may improve or maintain statistical accuracy or meaningfulness. For example, if vehicle prices vary dramatically in a nearby state due to local taxes or other costs, then even if two cities are within a short distance from each other, if they are in different states, then they may not be statistically relevant to each other for comparative analysis.

In addition, whether a search is conducted in nearby cities for similar vehicles may be configurable, in some embodiments. Another configurable aspect may include a "similarity control" (e.g., how similar vehicles need to be to each other to be included in the subsequent search) or which vehicles are considered similar to each other. For example, similar vehicles may be predetermined (e.g., by a system designer) or may be selected by the user. As an illustration, while some vehicles may have direct competitors (e.g., Honda® Accord® and Toyota® Camry®) and may be recognized as similar vehicles by predetermined configuration, other vehicles may not be pre-classified, but similar enough for a user to be interested in viewing such vehicles in a combined output. As an example, a pickup truck and a sports utility vehicle may not be pre-classified as being similar, but they both may satisfy a particular need of the user (e.g., towing cargo), and as such, the user may be interested in viewing price data for each vehicle.

The user may be provided with search results of the subsequent search. For example, one or more nearby cities that have sufficient data to present an estimated price for the vehicle of interest are presented. The cities may be presented using graphical interface elements, such as hyperlinks, graphical buttons, or other dynamic interface elements.

In an embodiment, one or more locations are presented, such that each location corresponds to a subset search result in the second search result. For example, when Hyderabad and Vijayawada both have relevant search results, they may be presented to the user. The user may then select a location, such as by activating a hyperlink in a online GUI. The search results corresponding to the user-selected location are then presented. The location may be based on a city, state, region, or province in various embodiments.

The user's choice is received. The user may indicate a choice by clicking on or otherwise activating a hyperlink, for example.

The chosen location may be displayed with the price estimate according to the search query's parameters. By displaying prices in nearby cities, the user is able to obtain a better understanding of what the estimated price of the vehicle of interest may be in the initial city of interest (e.g., Eluru in the continuing example).

When at least a threshold number of results are found, the search result may be presented to the user.

In an embodiment, the subsequent search may be run even when the threshold number of results is found, and results for nearby cities may be presented along with the initial city for comparison. Vehicle prices for the vehicle associated with the initial search or a vehicle associated with the subsequent search may be displayed using a chart, graph, table, or other graphical element.

As another example embodiment, subsequent searches may also be performed by changing the model year. For example, if a price for a 2005 Honda® Accord® is not available in Eluru, but a price is available for a 2004 Honda® Accord® in Eluru, the price for the 2004 model may be provided to the user.

Returning now to the description of FIG. 2A, the media receiving module 122, in some example embodiments, may be configured to receive the images 208. The images 208 may be taken by the user 140 operating the mobile device 130, or by the user 140, or another, operating one or more other devices and later stored on mobile device 130. The images 208 may include the sale items 204. For example, the user 140 may be willing to sell multiple items located in his garage. The user 140 may utilize the mobile device 130 to take the images 208 in his garage so that each image includes a plurality of the sale items 204. The data receiving module 126 may be configured to receive data associated with the sale items 204. The data may be provided by the user 140 or created automatically based on the images 208.

The processing module 124, in some example embodiments, may be configured to list the sale items 204 for sale. The sale items 204 are extracted from the images 208 received by the media receiving module 122 and the data received by the data receiving module 126. The processing module 124, in some example embodiments, may be configured to provide default data when no data is provided by the user. For example, if the user 140 provides no data and the sale items 204 are of low value, the processing module 124 may associate the sale items 204 with default data. For some example embodiments, the sale items 204 may be classified automatically with help of image recognition technology. Additionally, a light weight listing process may be utilized in which the user 140 may be provided with a few options. This approach may provide the multiple listing engine 120 with the data sufficient to list the sale item 204. Processing module 124 may provide for batch uploading. Such batch uploading and one or more embodiments thereof may be seen in U.S. patent application Ser. No. 10/912,637 filed Aug. 4, 2004 and entitled Method and Apparatus for Deploying High-Volume Listings in a Network Trading Platform.

The database 210, in some example embodiments, may be configured as a structured collection of records or data that is stored in a computer system which a computer program or a person using a query language may consult to answer queries. The records retrieved in answer to queries are information that can be used to make decisions. The database 210 may store the images 208 as well as the sale items 204. The sale items 204 may include goods and/or services which are shown in the images 208 provided by the mobile device 130 and listed on the publication system 150 by the multiple listing engine 120.

For some example embodiments, the bar code 206 may be utilized to provide the data needed for the sale items 204 to be listed on the publication system 150. The bar code 206 may be, for example, a Universal Product Code (UPC), which is widely used for tracking the sale items 204. Thus an image of the bar code 206 may be utilized to generate tags describing the sale items 204. The images 208, in some example embodiments, are photographs of the sale items 204. Each image of the images 208 may include more than one item.

Figure 3:
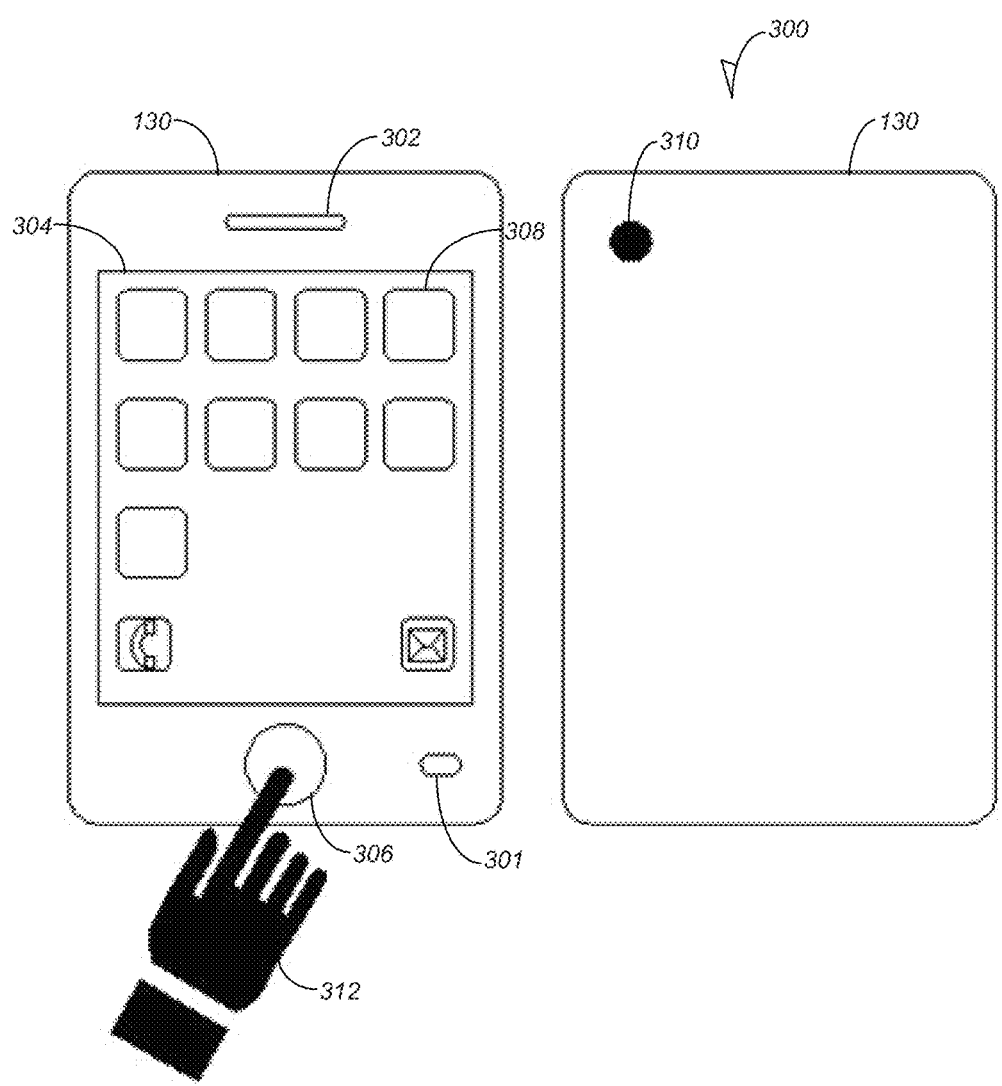
FIG. 3 is a block diagram showing back and front views of a mobile device, in accordance with an example embodiment.

FIG. 3 is a block diagram 300 showing back and front views of a mobile device 130, in accordance with an example embodiment. The mobile device 130, in some example embodiments, includes a receiver 301, a speaker 302, and a touch screen 304. The touch screen 304 may display a GUI, which in turn includes application icons 308 which may be selectable. One of the applications may be a request for price estimate which, when activated, requests a price estimate from price estimation module 128 for one or more items designated from the mobile device 130 by user 140. The mobile device 130 may further include a home button 306 and a camera 310, which is shown on the back view of the mobile device 130 but may, as well, be located in the front. Also shown is a hand 312 of the user 140 which may operate the mobile device 130 by manipulating the mobile device 130 through gestures of the hand 312.

For some example embodiment, because the mobile device 130 may have native camera integration, the user 140 may utilize the mobile device 130 for various applications adapted to take advantage of this functionality. For example, a user 140 may take a picture of the bar code 206 associated with a sale item. An application adapted to read the bar code 206 may determine generated data descriptive of the sale item based on the picture of the bar code 206. The data may be utilized in listing of the item by the multiple listing engine 120 or in a search for similar items on the publication system 150. Then the search results may be analyzed and displayed (e.g., average price of the product). The search result may be utilized in tagging the sale items 204.

In some example embodiments, the mobile device 130 may permit listing of the sale items 204 based on an image of the item and a minimal description. In some example embodiments, in order for the user 140 to receive data, the user may be offered a selection of choices. In further example embodiments, before the sale items 204 are listed on the publication system 150, the images 208 and related data are compiled in a personal draft area. Thus, the user 140 may take a picture, add some tags to the picture, and then place the picture and the tags in the personal draft area.

The receiver 301 may be a device for converting sound into electric signals and vice versa. The touch screen 304, in some example embodiments, is a display which may detect the presence and location of a touch within the display area. The touch screen 304 may be operated by touch or contact to the display of the device by a finger or hand. In some example embodiments, the touch screen 304 may sense other objects, such as a stylus. The home button 306, in some example embodiments, may be a button that permits a user to see the application icons 308. The application icons 308 may be utilized to start software applications installed on the mobile device 130.

A web application running on the mobile device 130 is an example of a software application that may be started with one of the application icons 308. A web application running on the mobile device 130 may employ generic web technologies that do not take advantage of the native capabilities of the mobile device 130. The web application may also mix HyperText Markup Language (HTML) content with native content. Further example applications running on the mobile device 130 may be designed for instant notifications or real time alerts of users of the mobile device 130. Camera 310 is a device used to capture images, either as still photographs or as sequences of moving images (movies or videos).

Figure 4:
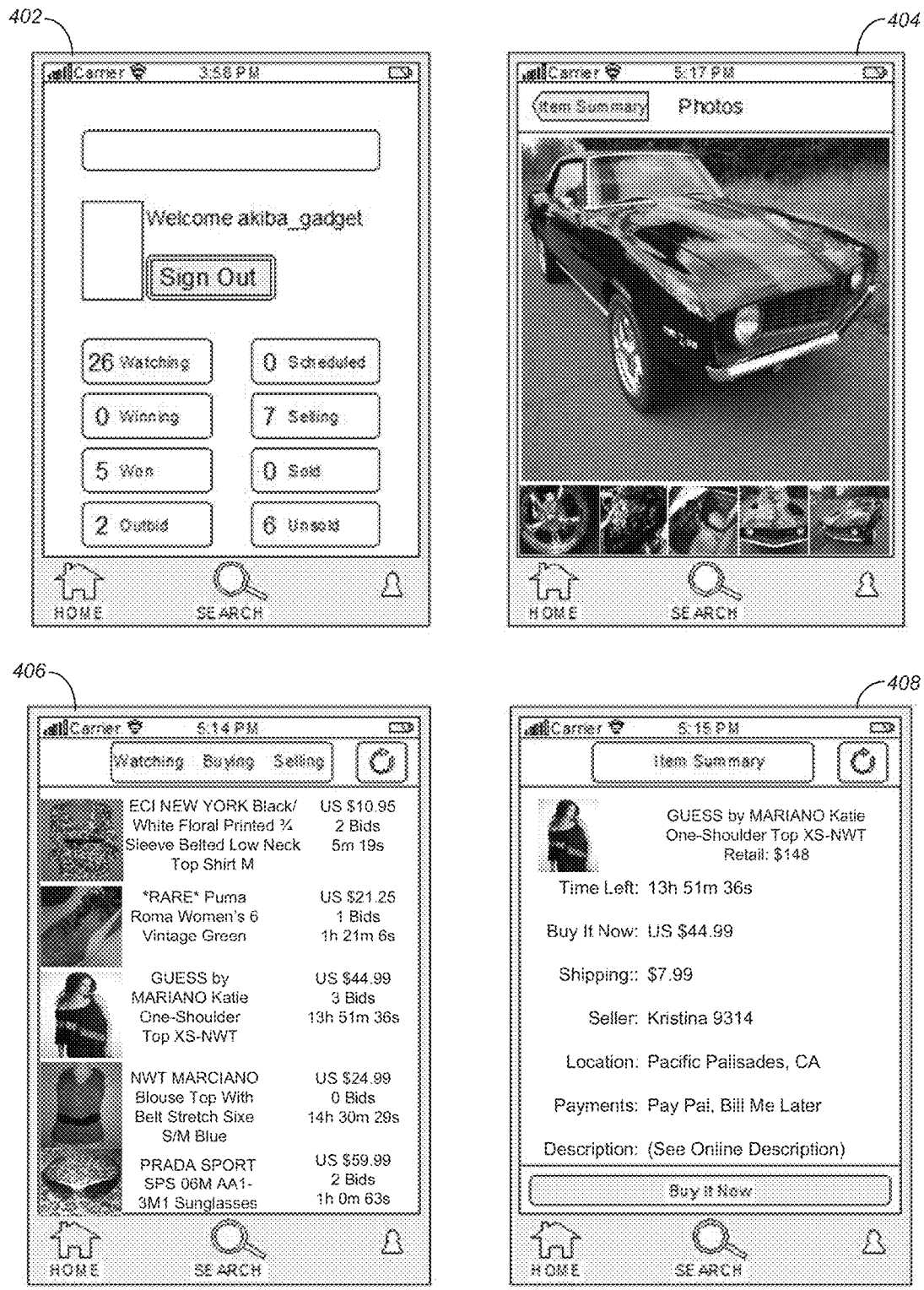
FIG. 4 is screenshots showing items that had been stored offline on a mobile device, displayed on the mobile device, in accordance with an example embodiment.

FIG. 4 illustrates several screenshots showing marketplace listings displayed on the mobile device 130, in accordance with an example embodiment. The screenshots may include a user status view 402, photos 404, multiple listings 406, and an item summary 408. The user status view 402 may include statistics for a particular user such as items listed for sale as well as the items that the user is interested in or for which the user is bidding. As can be seen from the example user status view 402, the user is currently "watching" 26 items and selling 7 items. Furthermore, the user has won 5 items he was bidding on was outbid for 2 items. The photos 404 show images that may be taken by the mobile device 130 and are currently stored on the mobile device 130 or in the user's draft area (not shown). The multiple listings 406 shows items that may have been extracted from the images 208 and tagged with the data received from the user 140. The items may be extracted from multiple images or from one image, taken in one or more sessions using the mobile device 130 or another device. The item summary 408 shows the summary of one item shown in the multiple listings 406.

Figure 5A:
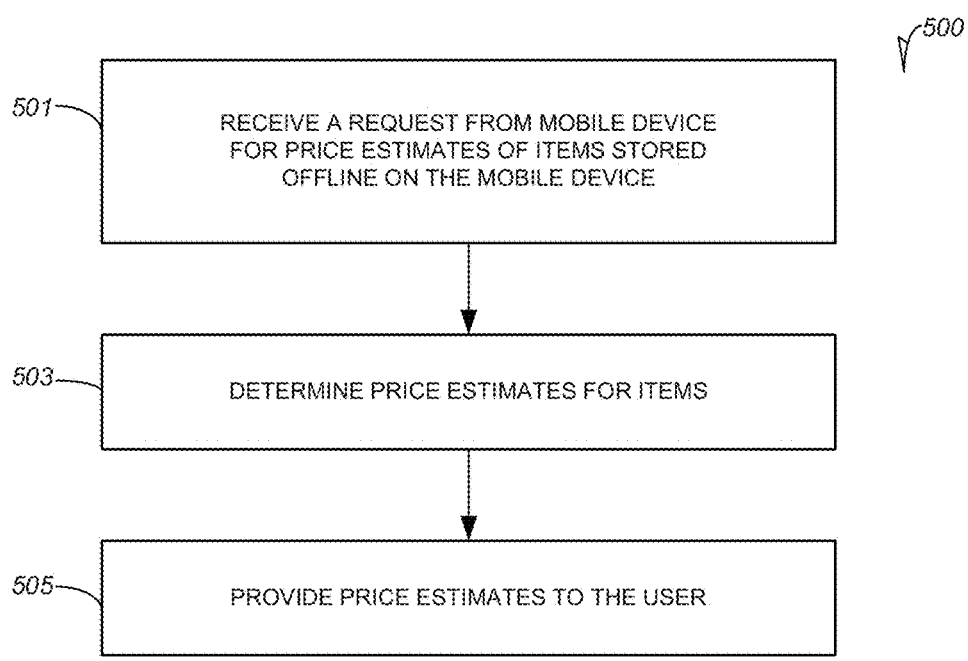
FIG. 5A is a flow chart illustrating a method for estimating prices for prospective sale of items that have been stored offline on a mobile device.

FIG. 5A is a flow chart illustrating a method 500 for estimating prices for prospective sale of items that have been stored offline on a mobile device, in step 501 the system receives a request from mobile device 130 for price estimates of one or more items stored online on the mobile device 130. Responsive to the request, price estimation module 128 determines one or more prices for one or more items at operation 503, as explained above. At operation 505, the price estimates may then be provided to the user 140 via a graphical user interface on mobile device 130 as discussed above.

Figure 5B:
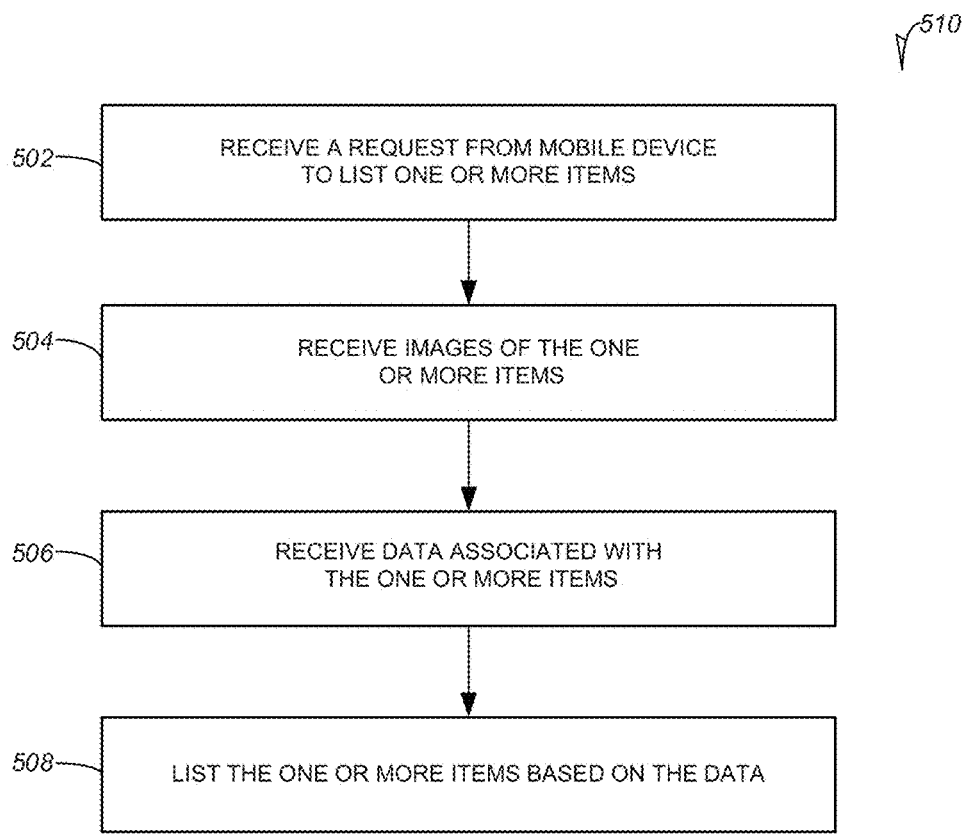
FIG. 5B is a flow chart illustrating a method for marketplace listings using a mobile device, in accordance with an example embodiment.

FIG. 5B illustrates an example method 510 for marketplace listings using the mobile device 130. The method 510 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the multiple listing engine 120, illustrated in FIG. 2. The method 500 may be performed by the various example modules discussed above with reference to FIG. 2. Each of these modules may comprise processing logic.

As shown in FIG. 5B, the method 510 may commence at operation 502, with the communication module 202 receiving a request from the mobile device 130 to list one or more sale items 204 on the publication system 150. At operation 504, the media receiving module 122 of the multiple listing engine 120 may receive images of the one or more sale items 204 from the mobile device 130. At operation 506, the data receiving module 126 may receive data associated with the one or more items 204 from the mobile device, and at operation 508, the processing module 124 may list the one or more sale items 204 on the publication system 150 based on the data received at operation 506. A further example method for marketplace listings using a mobile device which may be camera enabled 130 is described with reference to FIG. 6 and FIG. 7.

Figure 6A:
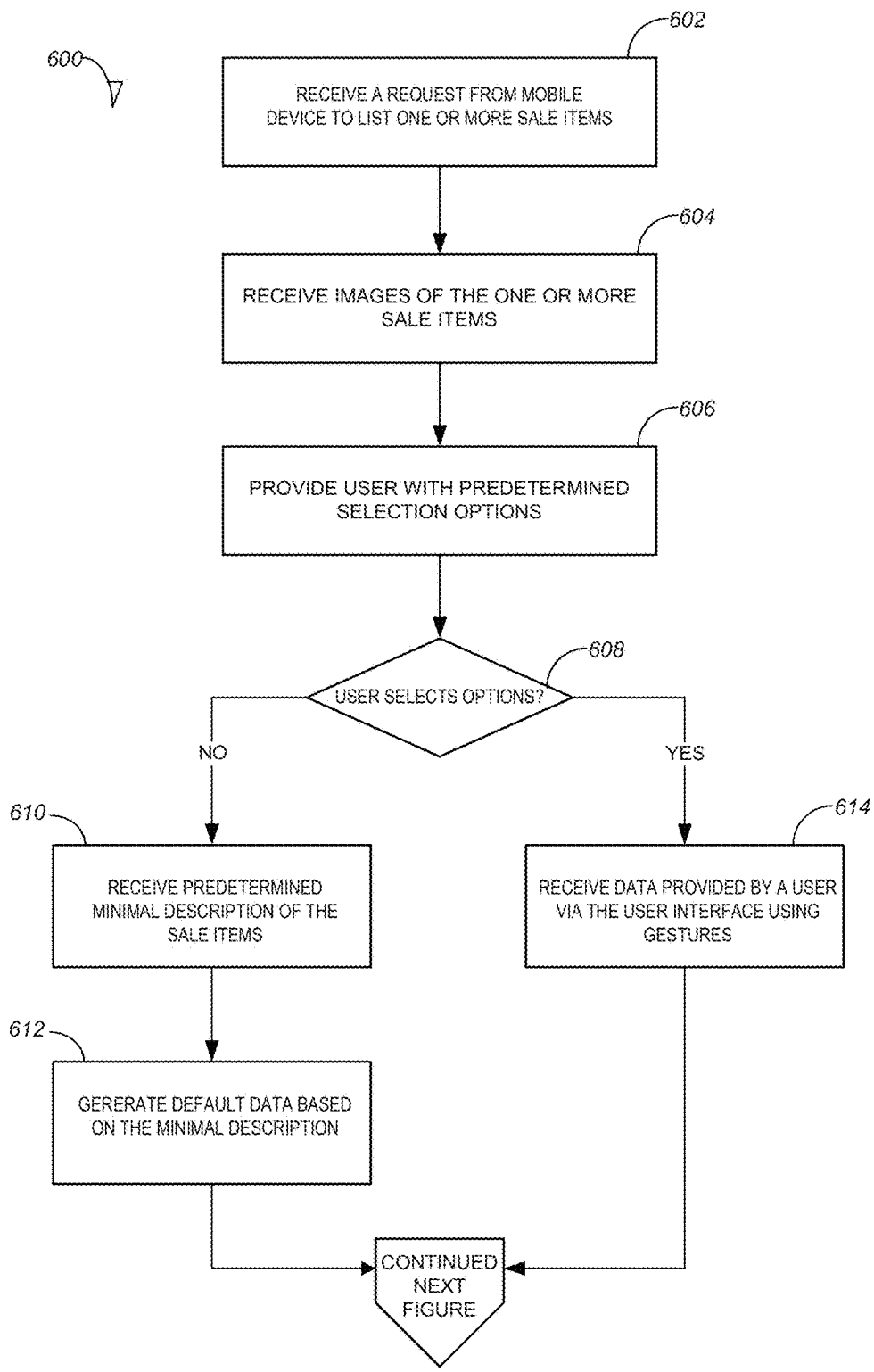
FIG. 6A is the first part of a flow chart illustrating a further method for marketplace listings using a mobile device, in accordance with an example embodiment.
Figure 6B:
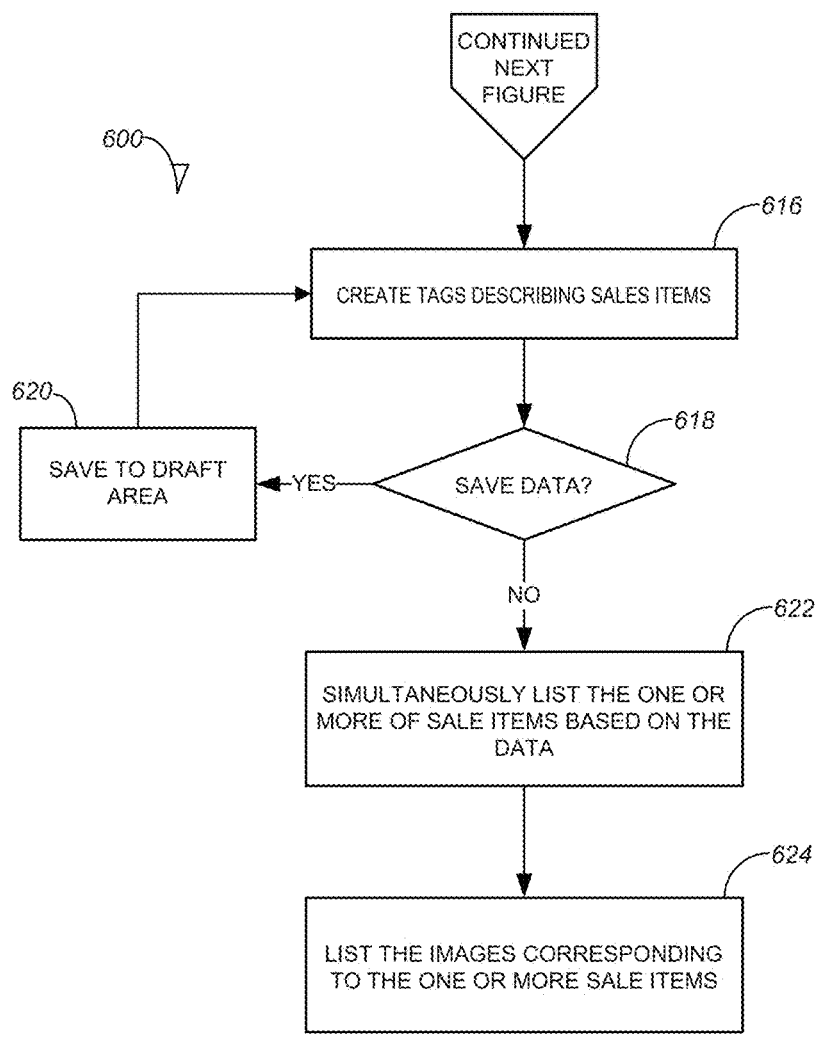
FIG. 6B is the second part of a flow chart illustrating a further method for marketplace listings using a mobile device, in accordance with an example embodiment.

FIG. 6 is the first part of a flow chart illustrating a further method 600 for marketplace listings using such a mobile device, in accordance with an example embodiment. As shown in FIG. 6, the method 600 may commence at operation 602 with the communication module 202 receiving a request from the mobile device 130 to list one or more sale items 204. At operation 604, the media receiving module 122 may receive images of the one or more sale items 204. The images received by the media receiving module 122 may be taken by the mobile device 130. The processing module 124 may need data to tag the sale items 204. The data may be supplied by a user or derived using some predetermined methods. The user may be explicitly asked to provide the data. Thus, at operation 606, the processing module 124 may provide the user 140 with predetermined selection options. For example, a message may be displayed asking the user whether an item shown in the image is a certain product. Other questions may be asked.

At the decision block 608, it may be determined by the processing module 124 whether or not the user 140 selects an offered option. If the user 140 selects an option, the processing module 124 may receive the data provided by the user 140 at operation 614. The data may be provided via the GUI of the mobile device 130 using various supported gestures. The GUI of the mobile device 130 may support direct manipulations including one or more of the following gestures: multi-touching, swiping, tapping, pinching, and reverse pinching, if on the other hand, it is determined at decision block 608 that the user 140 did not select any options, the processing module 124 may receive, at operation 610, an automatically-generated minimal description of the sale items 204. At operation 612, the processing module 124 may generate default data based on the minimal description received at operation 610.

FIG. 7 is the second part of a flow chart illustrating the further method 600 for marketplace listings using the mobile device 130, in accordance with an example embodiment. As shown in FIG. 7, the method 600 may continue with creating tags describing the sale items 204 at operation 616. The flow may proceed to decision block 618 where it may be determined whether the data needs to be saved to a personal draft area of the mobile device 130 before the items are listed on a marketplace. If it is determined that the data needs to be saved to the draft area, the data may be by saved at operation 620. This approach may be taken when it is determined that an intermediary step of compiling the images and the data in a draft area may be needed. If, on the other hand, it is determined that the data does not need to be saved, the method may proceed to list simultaneously the one or more sale items 204 based on the data available at operation 622. Thereafter, the images corresponding to the one or more sale items 204 may be listed alongside the sale items 204 at operation 624. It will be noted that the approach described is not limited to photographs and may extend to video and audio.

Figure 8:
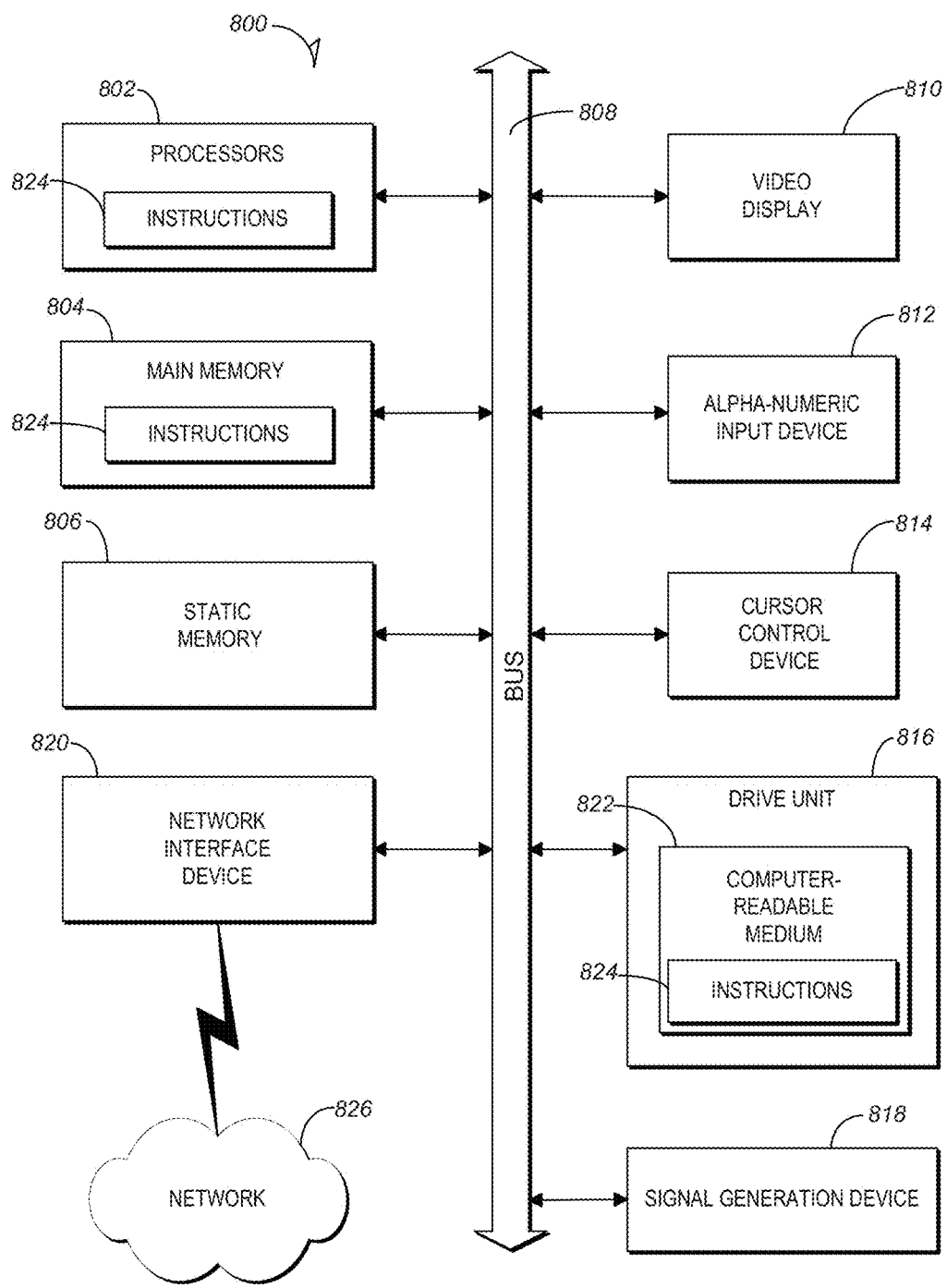
FIG. 8 is a diagrammatic representation illustrating an example machine in the form of a computer system within which a set of instructions for causing the machine to perform any one or more of the methodologies discussed herein may be executed.

Proceeding to FIG. 8, the example computer system 800 includes a processor or multiple processors 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 may also include an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a computer-readable medium 822, on which is stored one or more sets of instructions and data structures (e.g., instructions 824) embodying or utilized by any one or more of the methodologies or functions described herein. The instructions 824 may also reside, completely or at least partially, within the main memory 804 and/or within the processors 802 during execution thereof by the computer system 800. The main memory 804 and the processors 802 may also constitute machine-readable media.

The instructions 824 may further be transmitted or received over a network 826 via, the network interface device 820 utilizing any one of a number of well-known transfer protocols (e.g., Hyper Text Transfer Protocol (HTTP)).

While the computer-readable medium 822 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, systems and methods for marketplace listings using a mobile device which may be camera enabled have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method, the computer-implemented method comprising:
   identifying a plurality of items prospectively for sale one ore images stored on a mobile device;
   sending a request for price estimates for the plurality of items at a predefined interval;

determining one or more categories for individual items of the plurality of items;

determining, based on one or more filtering criteria, filtered listings for the individual items by removing one or more listings in an on-line publication system that correspond to the one or more categories;

determining time-sorted listings for the individual items by sorting remaining listings in the filtered listings based on one or more decay parameters;

determining ranked listings for the individual items by ranking sorted listings in the time-sorted listings based on one or more ranking criteria;

determining the price estimates for the individual items based on average or median sales prices of one or more items of the ranked listings;

presenting the price estimates for display on a graphical user interface of the mobile device;

receiving a selection of one or more of the individual items for listing on the on-line publication system; and listing the one or more selected individual items on the on-line publication system.

2. The computer-implemented method of claim 1, further including:
capturing the one or more images using a camera of the mobile device.

3. The computer-implemented method of claim 2, wherein at least one listing of the one or more individual items includes at least one captured image.

4. The computer-implemented method of claim 1, further including:
receiving listing data for at least one listing of the one or more individual items from a user via a user interface of the mobile device.

5. The computer-implemented method of claim 4, wherein the user interface supports direct manipulations including one or more of multi-touching, swiping, tapping, pinching, and reverse pinching.

6. The computer-implemented method of claim 1, further including:
receiving listing data for at east one listing of the one or more individual items as a selection of one or more predetermined selection options.

7. The computer-implemented method of claim 1, further comprising:
receiving tags describing the one or more individual items.

8. The computer-implemented method of claim 1, further comprising:
determining listing data for the one or more individual items based on default data.

9. The computer-implemented method of claim 8, further comprising:
generating the default data from predetermined minimal descriptions of the one or more individual items.

10. The computer-implemented method of claim 1, further comprising:
tagging the one or more individual items with metadata associated with the one or more categories.

11. The computer-implemented method of claim 1, wherein at least one listing of the one or more individual items includes rich media.

12. The computer-implemented method of claim 1, further including:
sending at least one listing of the one or more individual items to a draft area.

13. The computer-implemented method of claim 1, wherein the plurality of items is identified without direct user intervention, the request for the price estimates are sent without direct user intervention, or the plurality of items are identified and the request for the price estimates are sent without direct user intervention.

14. A non-transitory computer-readable storage device having embedded thereon instructions which, when executed by one or more processors, cause the one or more processors to perform operations comprising:
identifying, at a first predefined interval, a plurality of items prospectively for sale from one or more images stored on a mobile device;

sending, at a second predefined interval, a request for price estimates for the plurality of items;

determining one or more categories for individual items of the plurality of items;

determining, based on one or more filtering criteria, filtered listings for the individual items by removing one or more listings in an on-line publication system that correspond to the one or more categories;

determining time-sorted listings for the individual items by sorting remaining listings in the filtered listings based on one or more decay parameters;

determining ranked listings for the individual items by ranking sorted listings in the time-sorted listings based on one or more ranking criteria;

determining the price estimates for the individual items based on average or median sales prices of one or more items of the ranked listings;

presenting the price estimates for display on a graphical user interface of the mobile device;

receiving a selection of one or more of the individual items for listing on the on-line publication system; and listing the one or more selected individual items on the on-line publication system.

15. The non-transitory computer-readable storage device of claim 14, wherein the instructions when executed further cause the one or more processors to perform:
capturing the one or more images using a camera of the mobile device.

16. The non-transitory computer-readable storage device of claim 15, wherein at least one listing of the one or more individual items includes at least one captured image.

17. The non-transitory computer-readable storage device of claim 14, wherein the instructions when executed further cause the one or more processors to perform:
receiving listing data for at least one listing of the one or more individual items from a user via a user interface of the mobile device.

18. The non-transitory computer-readable storage device of claim 17, wherein the user interface supports direct manipulations including one or more of multi-touching, swiping, tapping, pinching, and reverse pinching.

19. The non-transitory computer-readable storage device of claim 14, wherein the instructions when executed further cause the one or more processors to perform:
receiving listing data for at least one listing of the one or more individual items as a selection of one or more predetermined selection options.

20. The non-transitory computer-readable storage device of claim 14, wherein the instructions when executed further cause the one or more processors to perform:
receiving tags describing the one or more individual items.

21. The non-transitory computer-readable storage device of claim 14, wherein the instructions when executed further cause the one or more processors to perform:

determining listing data for the one or more individual items based on default data.

22. The non-transitory computer-readable storage device of claim 21, wherein the instructions when executed further cause the one or more processors to perform:

generating the default data from a predetermined minimal description of the one or more individual items.

23. The non-transitory computer-readable storage device of claim 14, wherein the instructions when executed further cause the one or more processors to perform:

tagging the one or more individual items with metadata associated with the one or more categories.

24. The non-transitory computer-readable storage device of claim 14, wherein at least one listing of the one or more individual items includes rich media.

25. The non-transitory computer-readable storage device of claim 14, wherein the instructions when executed further cause the one or more processors to perform:

sending at least one listing of the one or more individual items to a draft area.

26. A system comprising:

one or more processors;

a non-transitory memory device including; instructions that, upon execution by the one or more processors cause the systems to:

identify a plurality of items prospectively for sale from one or more images stored on a mobile device at a predefined interval;

send a request for price estimates for the plurality of items;

determine one or more categories for individual items of the plurality of items;

determine, based on one or more filtering criteria, filtered listings for the individual items by removing one or more listings in an on-line publication system that correspond to the one or more categories;

determine time-sorted listings for the individual items by sorting remaining listings in the filtered listings based on one or more decay parameters;

determine ranked listings for the individual items by ranking sorted listings in the time-sorted listings based on one or more ranking criteria;

determine the price estimates for the individual items based on average or median sales prices of one or more items of the ranked listings;

cause the price estimates to be displayed on a graphical user interface of the mobile device;

receive a selection of one or more of the individual items for listing on the on-line publication system; and list the one or more selected individual items on the on-line publication system.

* * * * *

UNITED STATES PATENT AND TRADEMARK OFFICE
CERTIFICATE OF CORRECTION

PATENT NO. : 9,934,522 B2
APPLICATION NO. : 13/427324
DATED : April 3, 2018
INVENTOR(S) : Seng Tien Jonathan Teo Page 1 of 1

It is certified that error appears in the above-identified patent and that said Letters Patent is hereby corrected as shown below:

In the Claims

In Column 18, Line 64, in Claim 1, after "sale" insert -- from --.

In Column 18, Line 65, in Claim 1, delete "ore" and insert -- or more --, therefor.

In Column 19, Line 40, in Claim 6, delete "east" and insert -- least --, therefor.

In Column 21, Line 25, in Claim 26, delete "including;" and insert -- including --, therefor.

In Column 21, Line 26, in Claim 26, delete "processors" and insert -- processors, --, therefor.

Signed and Sealed this
Third Day of July, 2018

Andrei Iancu
*Director of the United States Patent and Trademark Office*